Aug. 19, 1924.
E. R. JOHNSON
SPIRAL CHUTE
Filed Oct. 30, 1922     6 Sheets-Sheet 4
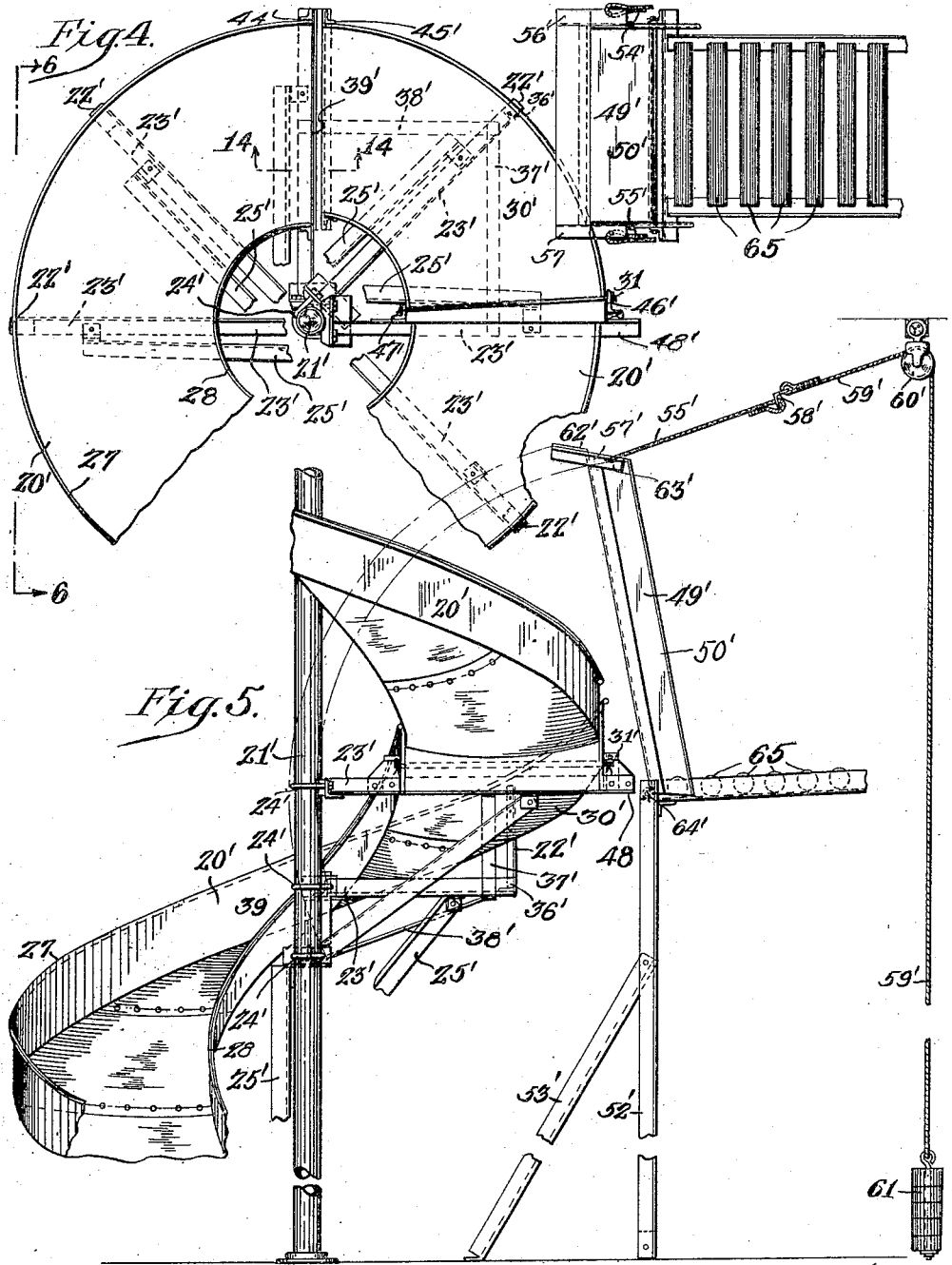

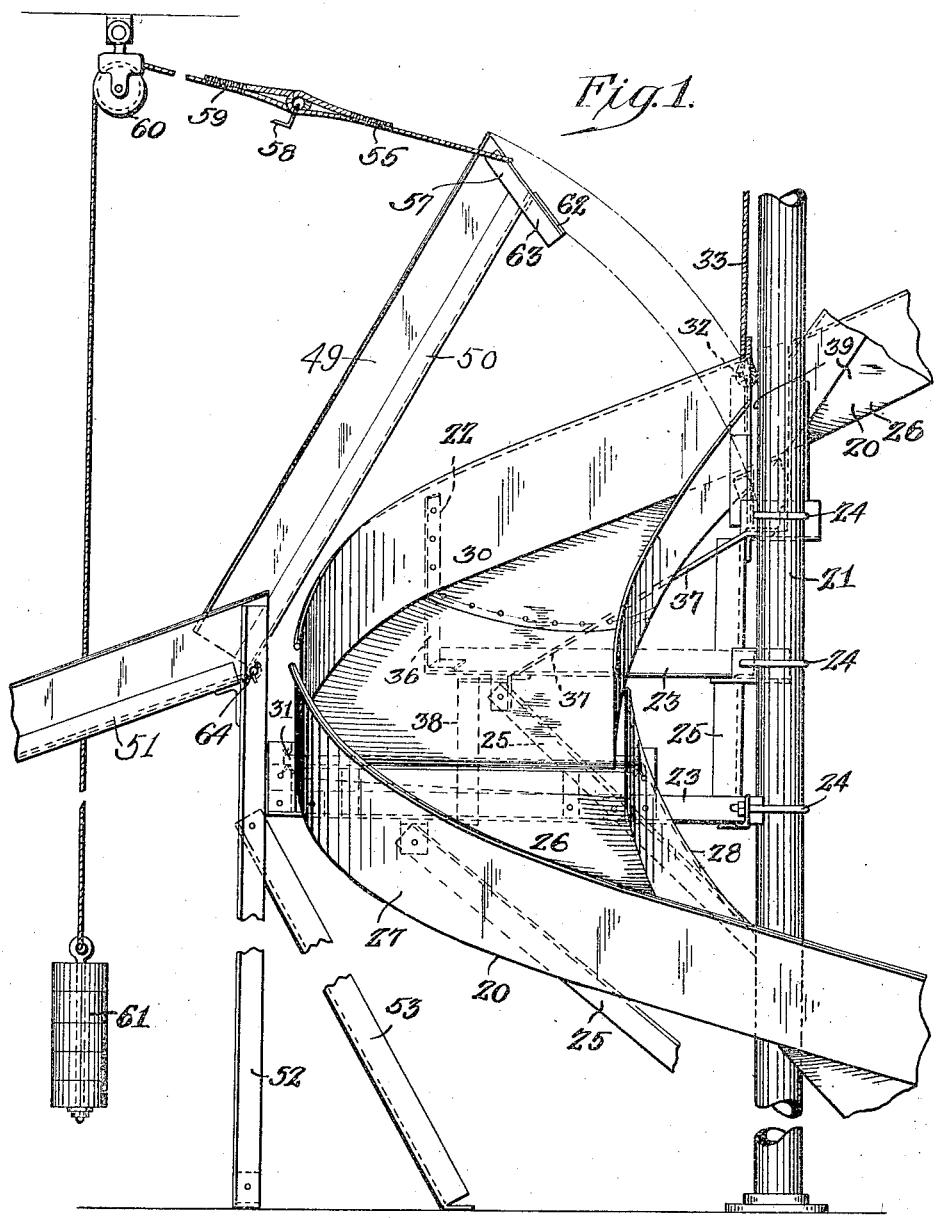

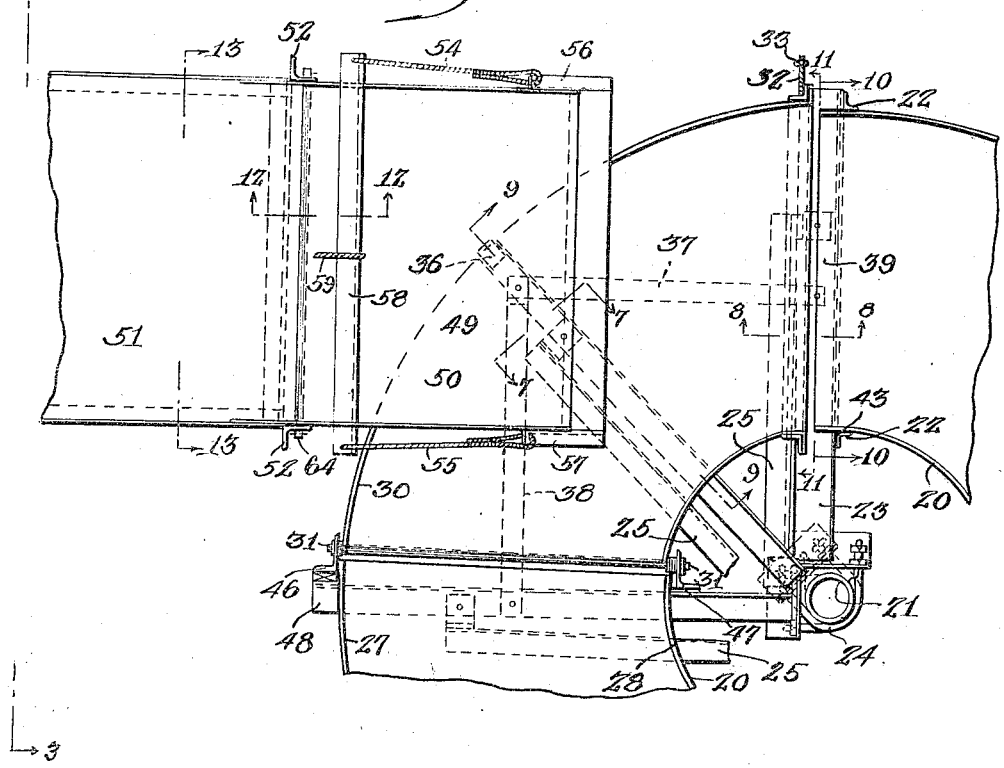

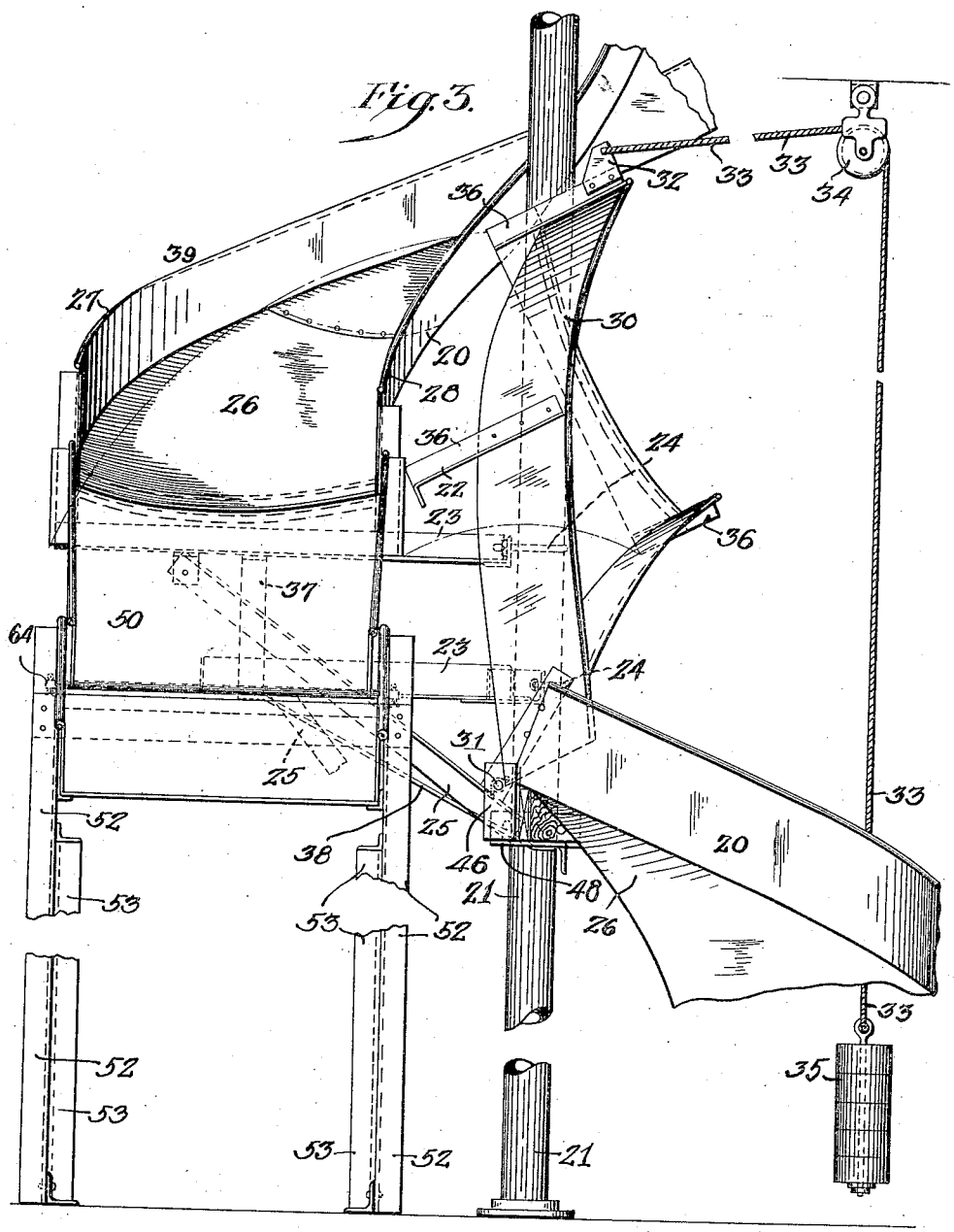

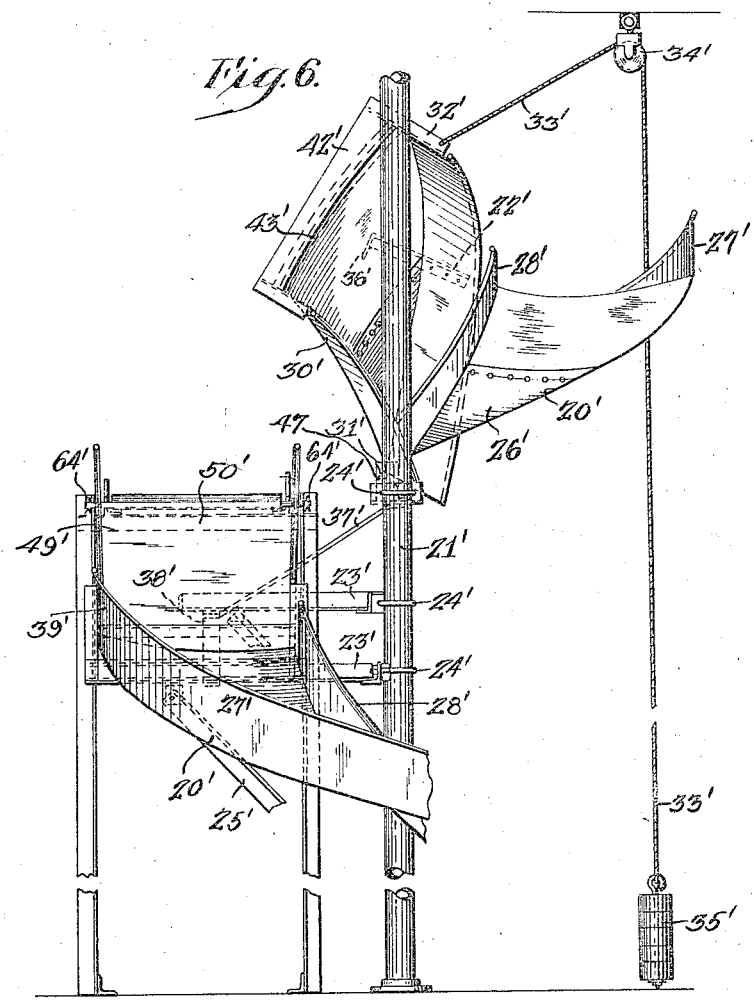

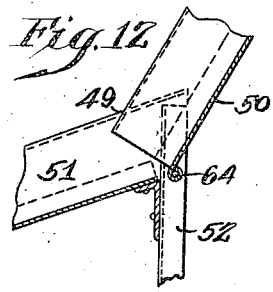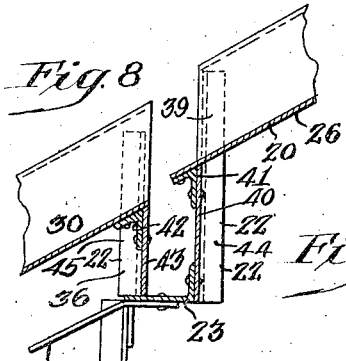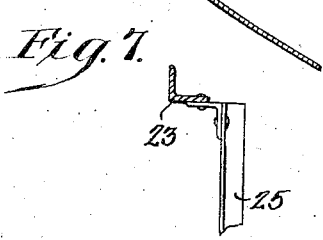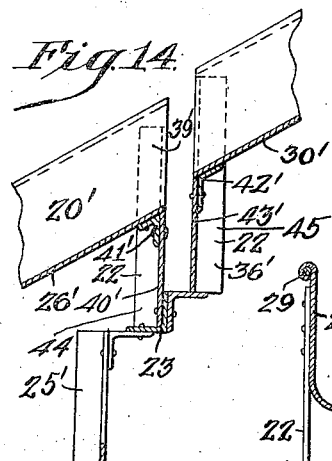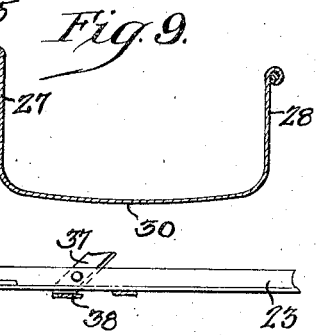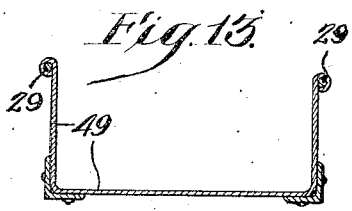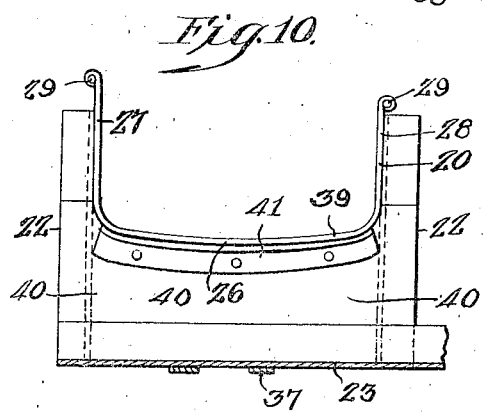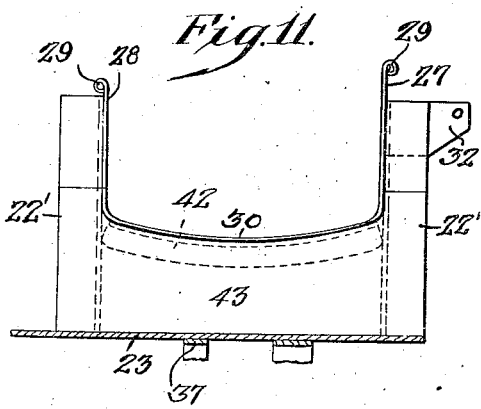

Patented Aug. 19, 1924.

1,505,392

UNITED STATES PATENT OFFICE.

EDMUND R. JOHNSON, OF PHILADELPHIA, PENNSYLVANIA, ASSIGNOR TO HASLETT CHUTE AND CONVEYOR COMPANY, OF PHILADELPHIA, PENNSYLVANIA, A CORPORATION OF PENNSYLVANIA.

SPIRAL CHUTE.

Application filed October 30, 1922. Serial No. 597,810.

*To all whom it may concern:*

Be it known that I, EDMUND R. JOHNSON, a citizen of the United States, residing at Philadelphia, in the county of Philadelphia and State of Pennsylvania, have invented a certain new and useful Spiral Chute, of which the following is a specification.

My invention relates to spiral chutes and more particularly to switches from and to spiral chutes.

The main purpose of my invention is to provide an improved form of switch at once easy and inexpensive to manufacture and install and efficient in operation.

A further purpose is to provide an improved switch adapted in somewhat modified forms to deliver into and from a spiral chute.

A further purpose is to make one section of a spiral chute movable and to connect it or a movable switching chute interchangeably with the adjoining section of the spiral chute, viewed as an "interchange" section.

A further purpose is to have the movable section of a spiral chute hinged at its upper or at its lower end according as the switch is to connect into or from the spiral, but preferably to hinge it at its end away from the interchange portion of the spiral chute.

A further purpose is to counterweight the hinged section of a spiral chute and the switching chute, adapting both to easy placement and removal from connection with the interchange portion of the spiral chute.

Further purposes will appear in the specification and in the claims.

I have preferred to illustrate my invention by but one application to each of the main uses of the invention, namely to feeding from and feeding into a spiral chute, respectively, selecting forms which have proved to be practical, effective and eminently satisfactory and which at the same time well illustrates the principles of my invention.

Figure 1 is a broken elevation illustrating my invention as applied to a switch leading from a spiral chute and with the spiral chute connected through.

Figure 2 is a top plan of Figure 1.

Figure 3 is a side elevation of Figure 1 upon line 3—3 of Figure 2, but with the hinged section of the spiral chute raised and with the switching chute connected to the interchange portion of the spiral chute.

Figure 4 is a top plan view illustrating my invention as applied to a switch leading into a spiral chute and with the spiral chute connected through.

Figure 5 is a front elevation of Figure 4.

Figure 6 is a side view of Figure 4, as indicated by line 6—6, but with the hinged section of the spiral chute raised.

Figure 7 is a section through line 7—7 of Figure 2.

Figure 8 is a section through line 8—8 of Figure 2.

Figure 9 is a section through line 9—9 of Figure 2.

Figure 10 is a section through line 10—10 of Figure 2.

Figure 11 is a section through line 11—11 of Figure 2.

Figure 12 is a section through line 12—12 of Figure 2.

Figure 13 is a section through line 13—13 of Figure 2.

Figure 14 is a section through line 14—14 of Figure 4.

In all the drawings like numbers refer to similar parts.

Referring to the drawings and describing in illustration and not in limitation:—

I first describe the invention in use as a switch to withdraw articles or materials from a spiral chute, as shown in Figures 1–3 and 7–13 inclusive.

The chute 20 is wound about the tubular standard 21 and is supported along its outer wall by a spirally-placed succession of vertical legs 22 that are in turn carried by successive horizontal members 23. These horizontal member are radial from the standard and follow the spiral law of the chute. They are clamped to the standard by the U-clamps 24 each of which also clamps the inner end of one of the struts or braces 25 by which one of the (higher) horizontal members above this point is supported. The legs, except in the hinged portion of the spiral, are riveted to the respective horizontal members which are maintained horizontal by the diagonal braces 25 extending downwardly to lower U-clamps 24.

The body of the spiral chute is of sheet steel or iron, the bottom 26 being made concave and the outer portion of the bottom and outer wall 27 being somewhat higher than the inner portion of the bottom and inner wall 28, respectively, to control the centrifugal action of bodies sliding down the chute. The tops of the chute walls are finished and strengthened by beading and are stiffened in any suitable way as by being bent.

The movable section 30 of the spiral chute is hinged at its lower end on the rod 31 which is preferably substantially radial and horizontal. If the movable section be a long one the axis of the hinge must be selected with a view to swinging the free end clear of the standard.

When the upper end of the movable section 30 is in connection with the "interchange" portion 39 of the upper spiral (the position of Figures 1, 2 and 8), the upper ends of its side walls and bottom are usually spaced somewhat along the spiral from the lower ends of the side walls and bottom of the interchange, as seen in the figures, such spacing being usually unobjectionable. It may sometimes be desirable to have this spacing extremely small and my construction is adapted to obtaining extremely small spacing when it is desirable, the hinge being substantially perpendicular to the line of division between the sections.

The upper ends of the walls and bottom of the movable section 30 are preferably respectively spread and lowered somewhat with respect to the spiral outline by the section above to avoid any catching of boxes or other material from the upper spiral upon these butt ends.

The upper end of the movable section carries on its outer side a bracket 32 to which is fastened the rope 33 passing over the pulley 34 to the counterweight 35. The section is thus counterweighted and adapted to easy placement and removal to and from its position of use as part of the spiral chute. The legs 36, 36' of the movable section, unlike the other legs 22, are unattached to their supporting horizontal members 23, and as the outer end of the horizontal member 23 is thus left unattached to the outside wall of the spiral chute it is necessary to have some support for it from lateral displacement. This support can be given to it by the sloping braces 37 and 38 from the adjacent horizontal members which are attached to the fixed portion of the spiral chute.

The detail of construction of the movable spiral section and the relation between its free end and the adjoining end of the fixed "interchange" section of the spiral chute are best seen in the sectional detail of Figures 8, 10 and 11. The end 39 of the interchange section of the spiral chute is rigidly connected to the horizontal supporting member 23, which is conveniently an angle, by the vertical plate 40 and the angle 41, the plate 40 being riveted to the two angles and the upper angle, 41, being riveted to the bottom of the spiral and bent to conform to its curvature.

The movable spiral section 30 carries across its upper end the angle 42 riveted to the section 30 and to which in turn is riveted the vertical foot plate 43. When the section is closed this plate seats or rests upon the horizontal member 23, as best seen in Figure 8. The receiving end of the movable spiral section is thus rigidly supported across its full width by the plate and angle 43 and 42 respectively, and additional stiffening angles 44 and 45 are riveted to opposite sides of the plates 40 and 43 and to the sides of the chute to reinforce the fixed and movable chute ends.

The lower end of the bottom of the movable spiral section is finished by bending the metal around a rod which may be the hinge rod 31, the ends of which turn in bracket bearings 46 and 47 that are carried by the horizontal member 48. For greater ease of manufacture I usually straighten out the curvature of the bottom at the hinge having found that in so short a distance this straightening is ordinarily not objectionable, and in the figures I show the contour of the bottom straight at the hinge 31. In particular cases this straightening may not be advisable and in this event I retain the chute curvature at the lower end of the bottom, and bend the ends of the rod 31 to be in respective alignment in the bearings 46 and 47.

As thus described, the hinged spiral section 30 is adapted to make chute delivery between the upper and lower fixed portions of the spiral when swung down to connect with the interchange portion 39, and when its upper end is swung away from connection with the interchange portion 39 by pivotally raising it on its hinge 31, there is room to shift the switching chute 49 into connection with the interchange portion 39, thus switching the path of boxes, packages, articles, etc., from the upper spiral to a table, floor, receptacle conveyor or other chute, as may be desired.

Though I have described a pivoted spiral chute section and shall describe a pivoted switching chute to interfit when the switching operation is performed, it will be obvious that in its broader aspects my invention is not limited to pivotal and swinging movements but is satisfied with other forms of movement.

The switching chute 49 comprises a hinged portion 50 adapted to switch from the spiral chute and connecting to the upper fixed (interchange) portion of the spiral chute interchangeably with the movable spiral chute section, and a fixed portion 51.

The switching chute is suitably supported by angle legs 52 braced by angles 53. The upper end of the hinged section 50 is counterweighted. Ropes 54 and 55, attached to brackets 56 and 57 respectively, connect to the transverse angle 58, and rope 59 from the middle of this angle passes over the pulley 60 to the counterweight 61.

The upper end of the hinged section 50 has substantially the contour of the lower end of the interchange portion of the spiral and of the upper end of the movable spiral chute section 30, except that the upper ends of the movable sections are slightly widened and lowered to insure against any catching upon butt ends, as already mentioned. The seating plate 62 and side angles 63 at the front end of the hinged chute section correspond to the seating plate 43 and stiffening angles 45 of the movable spiral chute section, and like the latter are adapted to seat upon the horizontal member 23, when the spiral chute section is raised and the switch is in place.

Where the movable chute sections are intended to swing into and out of position, as in the form illustrated, the switch chute section may be hinged in substantially the same way as the hinged spiral, the metal of the chute section bottom being bent around the end of the hinge rod 64 and the bottom being flattened or curved as desired. The rod turns in suitable bearings in the angle supporting legs 52.

In operation, when the spiral chute section is connected to the upper portion of the spiral chute, material or products are delivered from the "interchange" end 39 to the lower portion of the spiral chute through this movable chute spiral section. When the movable spiral section is disconnected and the switching chute section is connected to the interchange section, material or products from the upper part of the spiral chute will be diverted to the switching chute and to whatever receiving or other discharging devices may be fed through it.

I now describe my invention in use as a switch to a spiral chute, as shown in Figures 4, 5, 6 and 14.

The general form of the spiral chute is constructed as already described, the spiral chute 20′ winding about the tubular standard 21′ and being supported along its outer side by a spirally arranged succession of vertical legs 22′ that in turn are carried by successive horizontal members 23′, clamped at one end to the standard by the U-clamps 24′ and vertically braced to a lower U-clamp by diagonal braces 25′.

The legs, except in the hinged portion 30′, are fastened to the respective horizontal members 23′. In the hinged portion 30′ where the outer end of the horizontal member is not fixed to the corresponding leg 36′ it is braced by sloping members 37′ and 38′ to adjacent fixed horizontal supports 23′.

The "interchange" portion 39′ of the spiral, that is, the portion to which the movable spiral section 30′ and the hinged portion 50′ of the switching chute interchangeably connect, is the lower instead of the upper portion of the spiral, and the spiral section 30′ is hinged at its upper end instead of at its lower end. Likewise, the hinged portion 50′ of the switching chute slopes down when connected to the interchange instead of sloping up.

Both hinged sections are counterbalanced as already described.

The hinged chute section 50′ is shown as adapted to receive boxes, packages, articles or other products or materials from a series of rollers, 65, while in the first form the hinged chute section 50 delivers into a chute 51.

In the position shown in Figure 5 the movable spiral chute section connects the interchange spiral 39′ with the upper spiral chute providing for delivery into the interchange chute from the upper spiral chute section.

When the movable spiral section is swung from connection with the interchange 39′ to make room for the switching chute 50′ and the latter is swung down to connection with the interchange, through passage is provided for delivery from the rolls 65 into the lower spiral through the switch section.

It will be obvious that in the first form the spiral may be tapped at any level to accord with any existing need and subsequent handling of material diverted from the spiral, the present invention having to do merely with the means of tapping the chute irrespective of whether the tapping takes place above or below or at any particular floor level or whether the material withdrawn delivers to a table, a floor, another chute or other carrier.

Likewise, in the second form it is obvious that the level of and form of carrier to the switching chute is immaterial, being merely such as will best accord with existing need, irrespective of whether the carrier is a series of rolls 65 as illustrated in the drawings or a table or other device and irrespective of whether the switching chute is located above or below or at any particular floor level.

It will be evident that in view of my disclosure many variations of both forms of my invention will suggest themselves to others skilled in the art to meet the particular needs, to satisfy the whim of the designer or to avoid exact copying; and it is my purpose to claim herein all such as come within the reasonable spirit and scope of my invention.

Having thus described my invention, what

I claim as new and desire to secure by Letters Patent is:—

1. The combination of a spiral chute, a second spiral chute spaced from and lower than the first, a swinging chute section adapted to join the spiral chutes and to be swung free therefrom, and a swinging adjoining chute adapted interchangeably with the free end of the section to connect with an end of one of the spiral chutes.

2. The combination of a spiral chute, a second spiral chute spaced from and lower than the first, a movable chute section adapted with downward movement to unite the spiral chutes constantly connected to one of them and when moved to leave the other chute end open, a hinge support at the constantly connected end of the section adapting the section to placement and removal from between the spiral chutes, a counterweight support for the free end of the section, and a movable adjoining chute adapted interchangeably with the section by downward movement to connect with the opening end of the other of the spiral chutes.

3. The combination of a spiral chute, a second spiral chute spaced from and lower than the first, a movable chute section adapted to join the spiral chutes, a movable adjoining chute adapted interchangeably with the section to connect with an end of one of the spiral chutes, a counterweight support for one end of the adjoining chute adapting it to easy placement and removal from connection with said end of one of the spiral chutes and a stop common to both sections and supporting them when in connected position.

4. The combination of a spiral chute, a second spiral chute spaced from and lower than the first, a swinging chute section adapted to join the spiral chutes, a swinging adjoining chute adapted interchangeably with the section to connect with an end of one of the spiral chutes, hinge supports for the ends of the chutes and counterweight supports for the other end of the adjoining chutes, adapting to easy placement and removal from connection with said spiral chute end.

5. The combination of a spiral chute, a second spiral chute spaced from and lower than the first, a swinging chute section adapted to lower to connect the spiral chutes and to be raised to open the end of one chute, a hinge support at one end of the section and a counterweight support at the other end of the section, adapting it to easy placement and removal from uniting the spiral chutes.

6. The combination of a spiral chute, a second spiral chute spaced therefrom and lower than the first, a movable intermediate spiral chute section adapted to join between the two spiral chutes and an inlet section for the lower chute movable with respect to it and adapted interchangeably with the intermediate chute section to connect with the upper end of the lower chute.

7. The combination of a spiral chute, a second spiral chute spaced from and lower than the first, a movable chute section adapted to connect the spiral chutes, a pivot near the upper end of the section adapting it to be shifted from between the spirals, and a movable chute adapted interchangeably with the section to connect with the lower spiral chute.

8. The combination of a spiral chute, a second spiral chute spaced from and lower than the first, a swinging chute section adapted to connect the spiral chutes and pivoted near its upper end and a swinging inlet chute adapted interchangeably with the swinging section to connect with the lower spiral chute.

9. The combination of a spiral chute, a second spiral chute spaced from and lower than the first, a movable chute section adapted to connect the spiral chutes, a pivot near the upper end of the section adapting it to be moved pivotally from between the spirals, a counterweight support of the lower end of the section, a movable chute adapted interchangeably with the section to connect with the lower spiral chute and a hinge support at the upper end of the movable chute.

10. The combination of a spiral chute, a second spiral chute spaced from and lower than the first, a movable chute section adapted to connect the spirals, a pivotal support for the section at its lower end adapting the section to pivotal placement and removal from connection with the upper spiral, and a pivoted adjoining chute adapted interchangeably with the section to connect with the upper spiral.

11. The combination of a pair of spiral chute sections, an intermediate pivoted spiral section adapted to connect the two, and a pivot for the intermediate section, the bottom of the two sections being normally concaved and being straightened at the pivot to permit the bottom to be turned about the pivot.

12. A spiral chute having a concave bottom and a movable section therein, in combination with a hinge pintle about which the metal of the bottom of the chute is turned to form a hinge.

EDMUND R. JOHNSON.